Dec. 8, 1931.  H. J. BURNISH  1,835,010

PIPE LINE EXPANSION JOINT

Filed May 27, 1931

WITNESS  INVENTOR

Patented Dec. 8, 1931

1,835,010

UNITED STATES PATENT OFFICE

HOWARD J. BURNISH, OF SEWICKLEY, PENNSYLVANIA, ASSIGNOR TO SPANG, CHALFANT & COMPANY, INC., OF PITTSBURGH, PENNSYLVANIA, A CORPORATION OF PENNSYLVANIA

PIPE LINE EXPANSION JOINT

Application filed May 27, 1931. Serial No. 540,352.

My invention relates generally to pipe line expansion joints, and more particularly to joints in which a self-supporting expansion member is welded to the adjacent ends of horizontally-disposed pipes.

The procedure usually followed in laying pipe lines in ground trenches comprises placing a plurality of pipes on rotary jacks along the side of a trench, butt-welding the ends of several pipes together as they are rotated on the jacks, laying the strings of pipes thus formed in the trench, and then joining the strings by expansion members. The butt-welding of the pipes lying on the jacks is not difficult to accomplish because they are rotated so that the portion being welded is always uppermost. However, when the strings of butt-welded pipes are laid in the trench they are placed in their final position and can not be rotated during the welding of expansion members to the adjacent ends of the strings. Consequently, the welder must weld directly above himself, as well as at every other point in a circle. In order to make this at all possible, a cellar has to be dug beneath the joint to accommodate the welder as he works on the under side of the pipes. But overhead welding is difficult, and the result is often unsatisfactory. The reason for this is that the molten metal tends to fall away from the joint instead of fusing therein.

It is among the objects of my invention to provide a pipe line expansion joint which is adapted to efficient overhead welding, is simple in form, and the expansion member of which readily slips over the end of a pipe. Other objects and advantages will appear hereinafter.

To accomplish these and other objects I provide a hollow metallic expansion member encircling the adjacent ends of two horizontally-disposed pipes and spanning the gap therebetween, the innermost wall of which is severed to form inwardly-turned free edges resting one upon the outer wall of each of said pipes and forming therewith horizontally-disposed pockets within which the welding is done with very little tendency for the molten metal to flow out and away from the joint.

Figure 1:
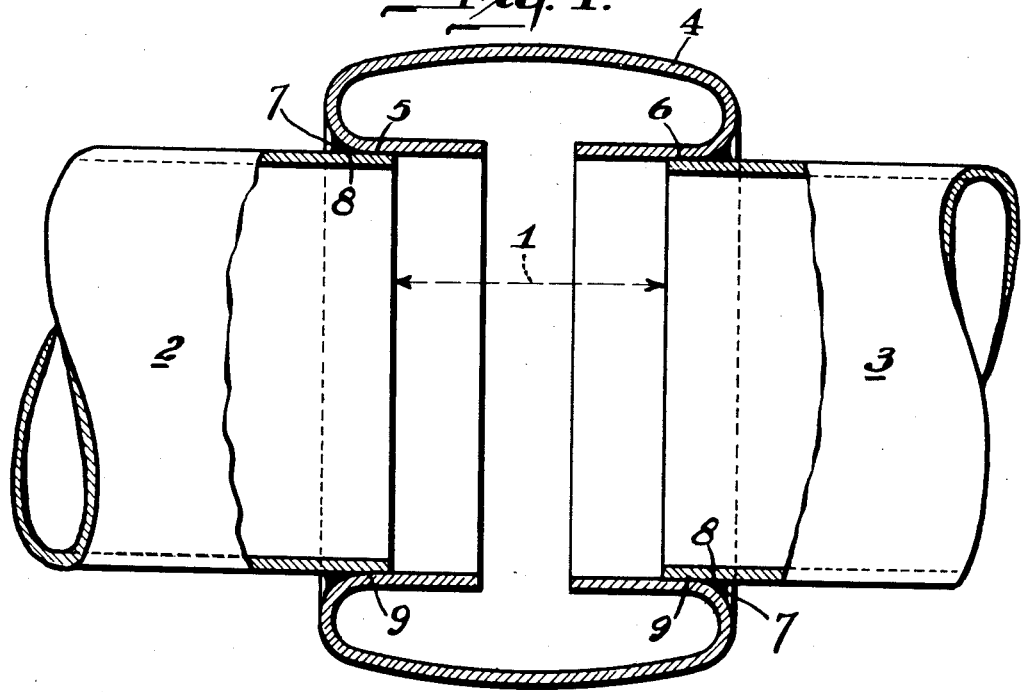
Figure 2:
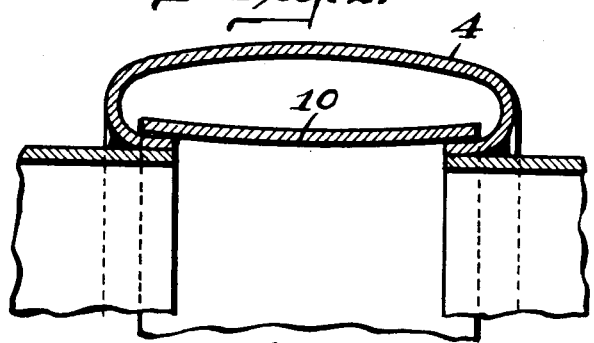
Figure 3:
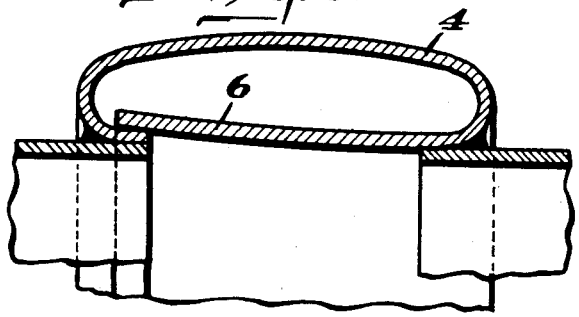

In the accompanying drawings, Fig. 1 is a longitudinal cross section of the ends of two pipes showing a cross section through an expansion member applied to them; and Figs. 2 and 3 similar views showing modified forms of the expansion members.

Referring to the drawings, two strings of a pipe line, each composed of a plurality of pipes which have been welded together at the side of a trench, are laid in the trench end-to-end with a gap 1 between their adjacent end pipes 2 and 3. This gap is necessary in order to allow for heat expansion of the pipes in each string. Although such a gap could be left between every pipe and the next one in line with it, it is usually sufficient if the ends of strings composed of several pipes be spaced apart.

To close gap 1, in order to make the pipe line continuous and at the same time not interfere with longitudinal expansion and contraction of the pipes, a hollow metallic expansion member 4 encircles and contacts with the end pipes 2 and 3 bordering on the gap, and spans the space between the two strings. The innermost wall of this member is severed to form inwardly-turned free edges 5 and 6 adapted to approach and recede from each other in harmony with pipes 2 and 3 as the pipes in the strings expand and contract. The wall of the expansion member bells out as it leaves the walls of pipes 2 and 3, and thus forms with said pipe walls horizontally-disposed annular pockets 7. It is within these pockets that welds 8 are made, joining the expansion member to the pipe ends. It is evident that by this construction longitudinal expansion and contraction of the pipe line is taken care of by the expansion member, for when the line expands edges 5 and 6 are forced toward each other, and when it contracts they are withdrawn. However, at all times welds 8 and the wall of the expansion member insure a leak-proof joint connecting the strings of pipes and making the line continuous.

As shown in Fig. 1, there is a substantial gap between the ends of pipes 2 and 3, the expansion member serving as a conduit at the gap. The accumulated length of the expansion members thus diminish the length of pipe required for a line. To limit to its capacity the permissible expansion of each member, its edges 5 and 6 preferably project beyond the ends of the pipes as shown.

As the strings of pipes have been laid in the trench in their final position, they cannot, as previously explained, be rotated to maintain the portion being welded uppermost, and therefore a cellar must be dug beneath the joint to accommodate the welder who must weld overhead. Pockets 7 are of considerable advantage in this overhead welding because the wall of the expansion member adjacent to and beneath the pipes serves as a floor 9 for pockets 7 as said wall bells outwardly. When the welding is being done, the molten metal, instead of falling away from the walls that are to be united, is held in place by floor 9 thus making the welding operation easier to accomplish and also insuring a dependable juncture.

The campanular opening into which the ends of the pipes are thrust makes it a simple matter to slip the expansion member over the end of a pipe. In order to render this member self-supporting so that reinforcing members will not be necessary to make it function properly, its wall is of such thickness as to be strong enough to withstand the pressure within the pipes. Hence, the task of joining it to the pipes is greatly simplified, and the number of parts and the resulting expense are materially reduced.

Although it has been found that the annular chamber formed by the hollow expansion member does not hinder the flow of material through the pipe line, if it be desired, the gap between edges 5 and 6 can be closed in any suitable manner, such as illustrated in Figs. 2 and 3. The modification shown in Fig. 2 includes an annular plate 10 disposed within the hollow expansion member and secured to its wall at one side of the gap, the opposite edge of the plate overlapping the wall at the other side of the gap. The same result is reached, as shown in Fig. 3, by extending the wall of the expansion member across the gap so that one of the edges, 5 or 6 overlaps the opposite edge. In either of these modifications the functioning of the expansion member is not interfered with, because two free edges always remain.

According to the provisions of the patent statutes, I have explained the principle and mode of operation of my invention and have illustrated and described several embodiments of it. However, I desire to have it understood that, within the scope of the appended claims, the invention may be practiced otherwise than as specifically illustrated and described.

I claim:

1. In a pipe line, the combination with two horizontally-disposed pipes laid end-to-end with a gap between them, of a self-supporting hollow expansion member encircling the adjacent ends of said pipes and spanning said gap, said member having inwardly-turned edges resting one upon the outer wall of each of said pipe ends and forming therewith horizontally-disposed pockets, and weld connections between said edges of said expansion member and said outer walls of the pipes.

2. In a pipe line, the combination with two horizontally-disposed pipes laid end-to-end with a gap between them, of a self-supporting hollow expansion member encircling the adjacent ends of said pipes and spanning said gap, said member having inwardly-turned edges resting one upon the outer wall of each of said pipe ends and forming therewith horizontally-disposed pockets, an annular plate disposed within said hollow expansion member and secured to one of said edges and overlapping the other, and weld connections between said edges of said expansion member and said outer walls of the pipes.

3. In a pipe line, the combination with two horizontally-disposed pipes laid end-to-end with a gap between them, of a self-supporting hollow expansion member encircling the adjacent ends of said pipes and spanning said gap, said member having inwardly-turned edges resting one upon the outer wall of each of said pipe ends and forming therewith horizontally-disposed pockets, one of said edges extending to and over-lapping the other edge, and weld connections between said edges of said expansion member and said outer walls of the pipes.

In testimony whereof I sign my name.

HOWARD J. BURNISH.